United States Patent
Borthakur et al.

(10) Patent No.: US 10,782,236 B2
(45) Date of Patent: Sep. 22, 2020

(54) METHODS AND APPARATUS FOR A BIOSENSOR

(71) Applicant: SEMICONDUCTOR COMPONENTS INDUSTRIES, LLC, Phoenix, AZ (US)

(72) Inventors: Swarnal Borthakur, Boise, ID (US); Ulrich Boettiger, Garden City, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 166 days.

(21) Appl. No.: 16/005,027

(22) Filed: Jun. 11, 2018

(65) Prior Publication Data

US 2019/0376899 A1 Dec. 12, 2019

(51) Int. Cl.
*G01N 21/64* (2006.01)
*H04N 5/374* (2011.01)

(52) U.S. Cl.
CPC ..... *G01N 21/6486* (2013.01); *G01N 21/6428* (2013.01); *G01N 2021/6439* (2013.01); *H04N 5/374* (2013.01)

(58) Field of Classification Search
CPC .......... G01N 21/6486; G01N 21/6428; G01N 2021/6439; H04N 5/374
See application file for complete search history.

(56) References Cited

U.S. PATENT DOCUMENTS

| 5,894,351 | A | 4/1999 | Colvin |
| 2001/0035947 | A1* | 11/2001 | Fry ..................... G01N 21/0303 356/73 |
| 2004/0089057 | A1* | 5/2004 | Hobbs .................. G01N 30/466 73/61.58 |
| 2004/0234417 | A1* | 11/2004 | Schienle ............ G01N 21/6454 422/82.08 |
| 2008/0081769 | A1* | 4/2008 | Hassibi ................... C40B 30/04 506/9 |
| 2008/0197272 | A1* | 8/2008 | Kiesel ..................... G01N 21/05 250/226 |
| 2011/0262307 | A1* | 10/2011 | Packirisamy .......... G01N 21/05 422/82.08 |
| 2012/0044339 | A1* | 2/2012 | Stith ................... G01N 21/6458 348/79 |
| 2013/0100454 | A1* | 4/2013 | Walters .............. G01N 21/6428 356/445 |
| 2015/0104880 | A1 | 4/2015 | Tagawa et al. |
| 2015/0116484 | A1 | 4/2015 | Kim et al. |
| 2015/0125944 | A1 | 5/2015 | Olson et al. |

* cited by examiner

*Primary Examiner* — Blake C Riddick
(74) *Attorney, Agent, or Firm* — The Noblitt Group, PLLC; Hettie L. Haines (57) ABSTRACT

Various embodiments of the present technology may comprise a method and apparatus for a biosensor. The biosensor comprises a vertical flow channel that extends through a photodiode, and wherein the photodiode is lateral to the channel's vertical sidewall.

20 Claims, 8 Drawing Sheets

METHODS AND APPARATUS FOR A BIOSENSOR

BACKGROUND OF THE TECHNOLOGY

Image sensors may be used in various biosensing applications. Specifically, complementary metal oxide semiconductor (CMOS) image sensors may be used to detect a fluorescent radiation emitted from a biological fluid sample. In a conventional biosensor, the fluid sample flows across the flat, horizontal surface of the sensor and is able to capture only a part of the emitted isotropic light. In addition, due to the structure of the image sensor, thick optical filters must be added to the sensing surface of the image sensor to block excitation light. The filters, however, increase the distance from the fluid sample to the sensing surface and increase cross-talk of the isotropic emission into neighboring pixels, which reduces the spatial resolution of the sensor.

SUMMARY OF THE INVENTION

Various embodiments of the present technology may comprise a method and apparatus for a biosensor. The biosensor comprises a vertical flow channel that extends through a photodiode, and wherein the photodiode is lateral to the channel's vertical sidewall.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various color filters, read out circuitry, fluid collection areas, and the like, which may carry out a variety of functions. In addition, the present technology may be practiced in conjunction with any number of sensing applications, such as medical, chemical, pharmaceutical, and biological applications, to analyze biological samples and/or detect fluorescence.

Methods and apparatus for a biosensor according to various aspects of the present technology may operate in conjunction with any suitable sensing system, such as a CMOS image sensor. Further, methods and apparatus for the biosensor may be utilized for biological imaging, such as DNA sequencing, fluorescent marker detection, and the like.

Figure 1:
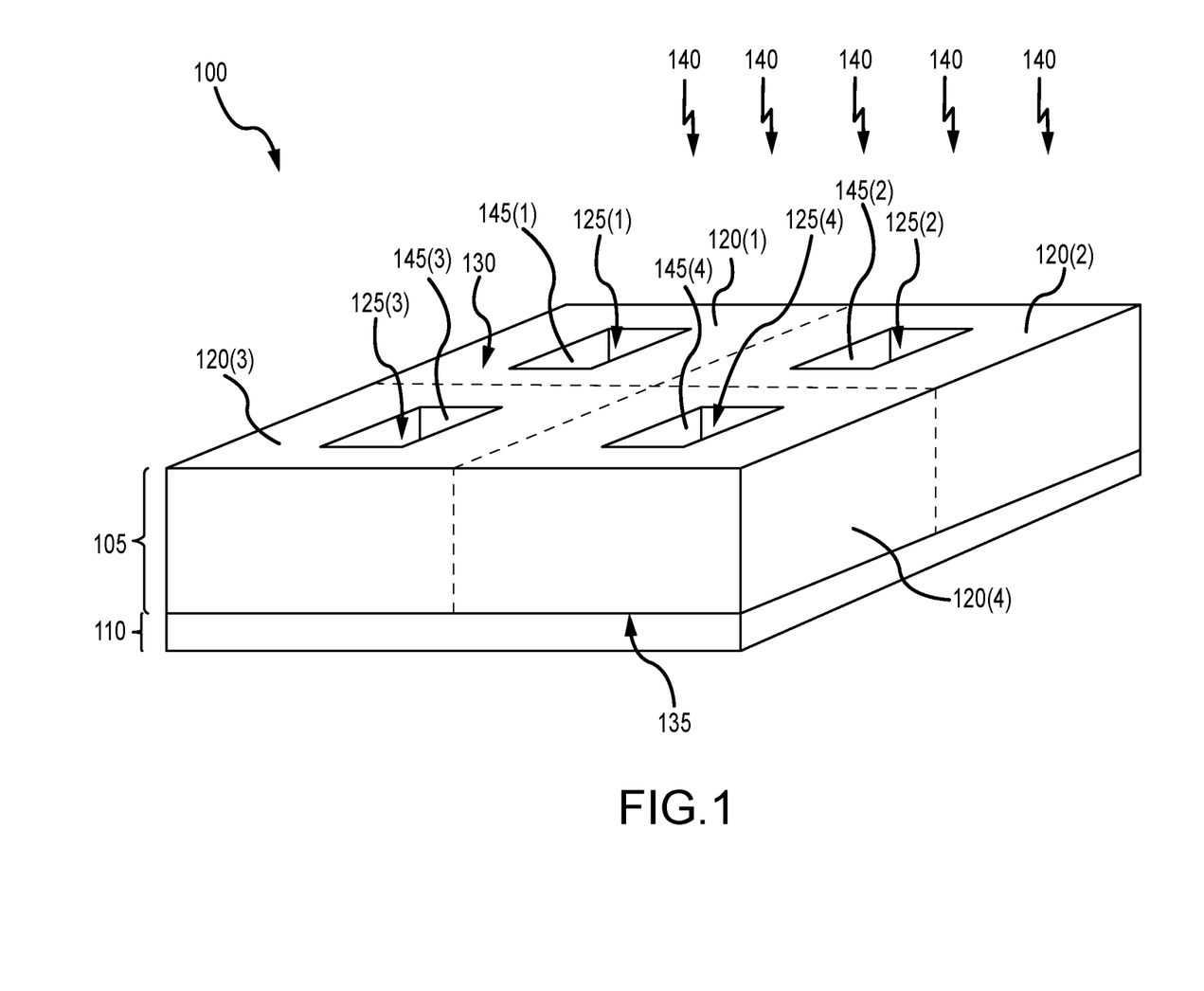
FIG. 1 representatively illustrates a perspective view of a biosensor in accordance with an exemplary embodiment of the present technology.
Figure 2:
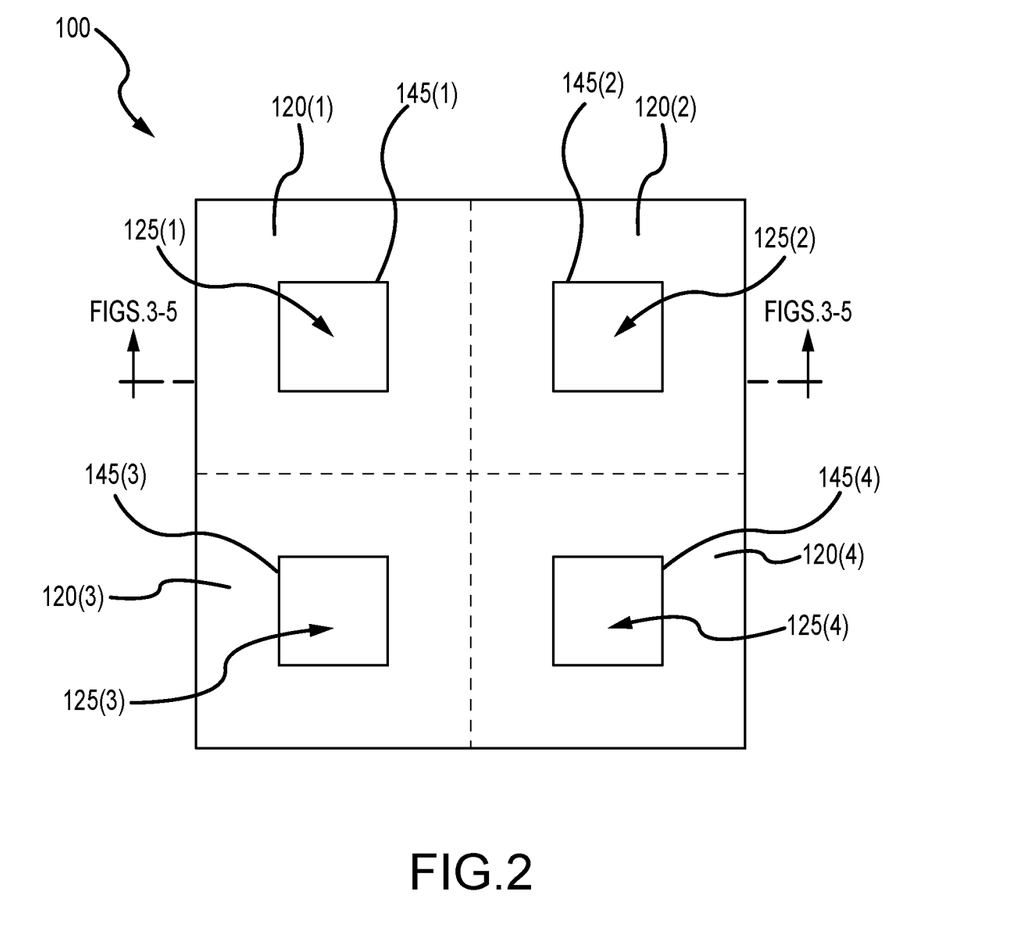
FIG. 2 is a top view of the biosensor in accordance with an exemplary embodiment of the present technology.
Figure 3:
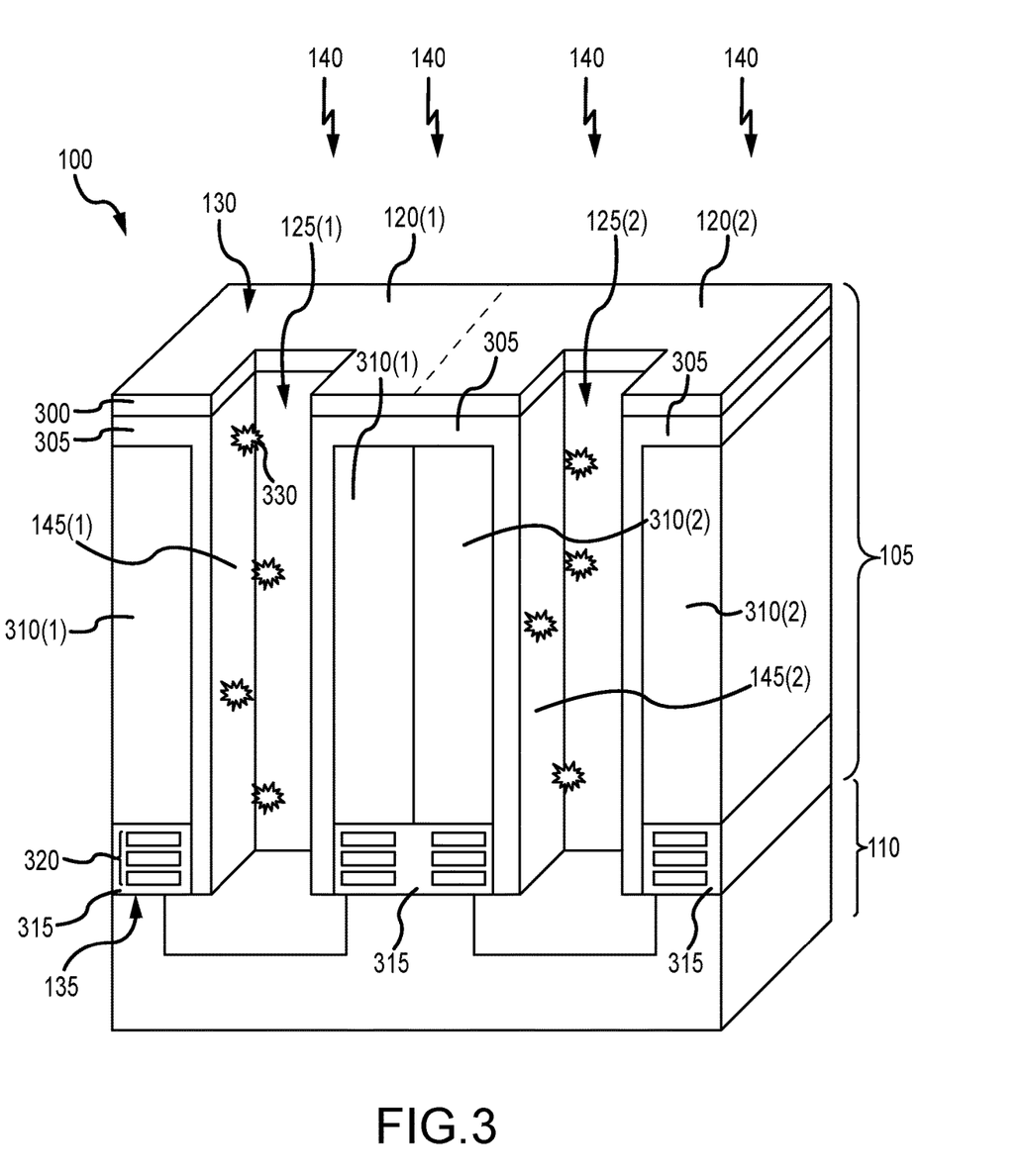
FIG. 3 is a cross-sectional view of the biosensor in accordance with an exemplary embodiment of the present technology.

Referring to FIGS. 1-3, a sensing device 100 (i.e., biosensor) may be configured to receive a fluid, for example a fluid containing a biological material. According to various embodiments, the sensing device 100 detects fluorescent radiation 330 emitted by the biological material (molecules) in the fluid. In general, the biological material emits isotropic fluorescent light. Embodiments of the present technology are configured to capture more of the emitted fluorescence 330 than conventional biosensors.

According to various embodiments, the sensing device 100 may comprise a sensor chip 105 for receiving the biological fluid and detecting the fluorescence 330, and a carrier chip 110 bonded to the sensor chip 105. For example, the sensor chip 105 may comprise a first planar surface 130 facing upwards and a second opposing planar surface 135 that is bonded to the carrier chip 110. According to an exemplary embodiment, when the sensing device 100 is in use, the first and second planar surfaces 130, 135 are oriented in a horizontal manner.

The sensor chip 105 may be configured to block excitation light 140 and detect the isotropic fluorescent light 330 emitted from the biologic fluid. The sensor chip 105 may be configured to receive fluid with biological molecules of any size. In various embodiments, the sensor chip may comprise a detection region 125 that extends perpendicular to (i.e., vertically from) the first planar surface 130 through the sensor chip 105 and has an opening at the first planar surface 130. For example, the detection region 125 may collect and hold the biological fluid—the detection region 125 in this arrangement may be referred to as a "hole" or a "well."

In various embodiments, the sensor chip 105 may be configured for continuous flow of the biological fluid and detection of the fluorescence 330. For example, the detection region 125 may extend all the way through the sensor chip 105 from the first planar surface 130 (and having an opening at the first planar surface 130) to the second planar surface 135—the detection region 125 in this arrangement may be referred to as a "channel" or a "thru-hole."

According to various embodiments, the detection region 125 may be defined by a sidewall 145 extending downwardly through a pixel 120 from the first planar surface 130. The detection region 125 may be centrally located in the pixel 120.

The detection region 125 may comprise any suitable shape or size. For example, the detection region 125 may be square, circular, rectangular, or any other suitable shape, and may be selected according to the desired application. In addition, the size of the detection region 125, such as a diameter or length/width, may be selected according to the desired application.

In various embodiments, the sidewall of the detection region 125 may be coated with an antireflective coating (ARC) (not shown) to improve the quantum efficiency of the pixel 120. The ARC may comprise any suitable material, such as hafnium oxide ($HfO_x$), tantalum oxide ($TaO_x$), silicon nitride, and the like.

The sensor chip 105 may comprise a pixel array to detect the light and convert the light into electrical signals. The pixel array may comprise a plurality of pixels, such as pixels 120(1):120(4). The pixel array may comprise any number of pixels, for example, hundreds or thousands. The pixel array may be arranged in a matrix pattern with rows and columns, a hexagonal pattern, an irregular pattern, or any other suitable pattern. In various embodiments, each pixel 120 may comprise a photosensor, such as a photodiode 310, to detect light and convert the detected light into a charge.

In an exemplary embodiment, and referring to FIGS. 1-4, the sensor chip 105 comprises a first pixel 120(1) comprising a first detection region 125(1) centrally located in the first pixel 120(1). The first pixel 120(1) may further comprise a first photodiode 310(1) positioned around and lateral to a first sidewall 145(1) of the first detection region 125(1). In other words, the first photodiode 310(1) is concentric with the first detection region 125(1) and laterally adjacent to the first sidewall 145(1).

Similarly, the sensor chip 105 comprises a second pixel 120(2) comprising a second detection region 125(2) centrally located in the second pixel 120(2). The second pixel 120(2) may further comprise a second photodiode 310(2) positioned around and lateral to a second sidewall 145(2) of the second detection region 125(2). In other words, the second photodiode 310(2) is concentric with the second detection region 125(2) and laterally adjacent to the second sidewall 145(2).

Figure 5:
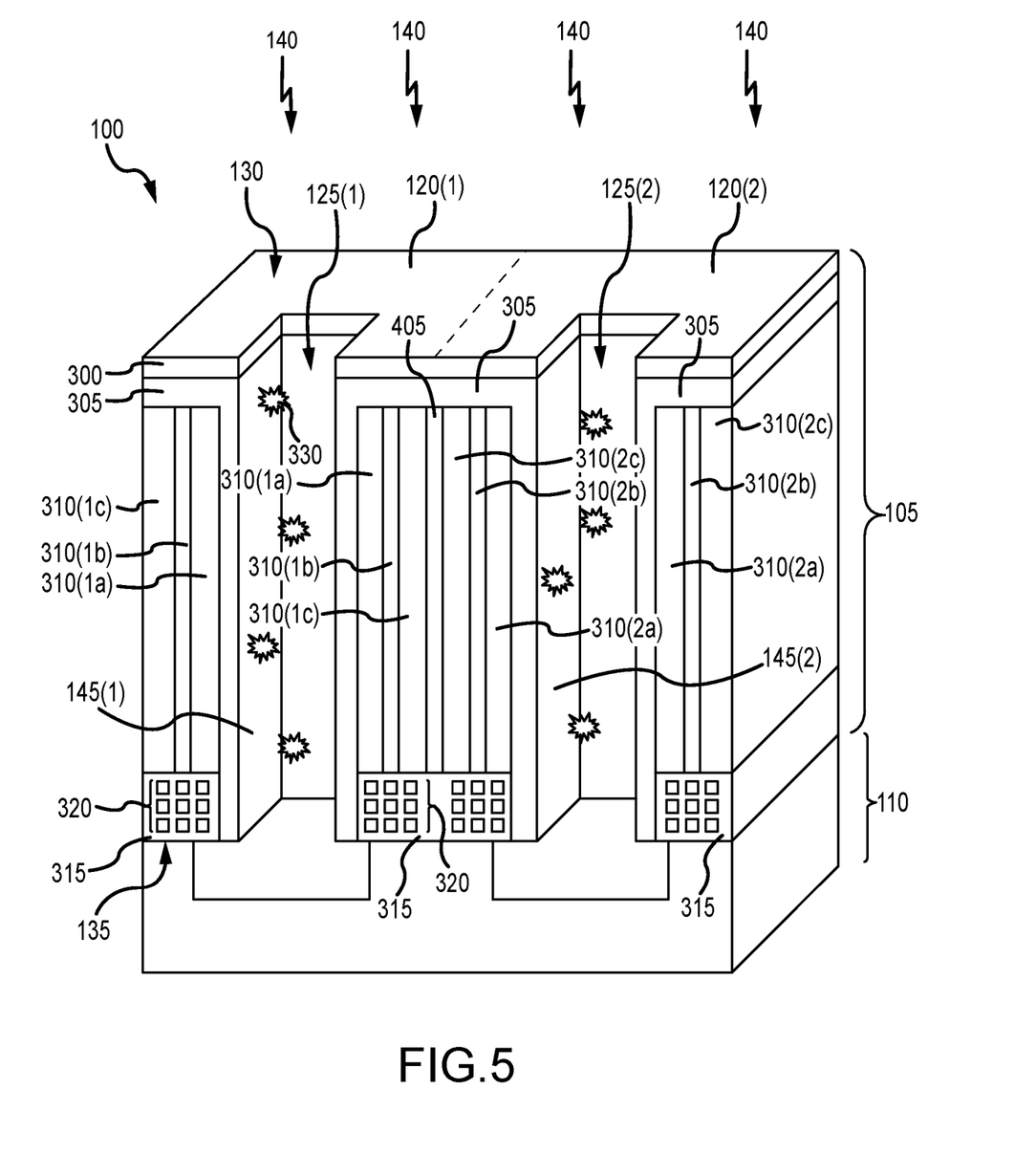
FIG. 5 is a cross-sectional view of the biosensor in accordance with an alternative embodiment of the present technology.

In an alternative embodiment, and referring to FIGS. 1, 2 and 5, each pixel 120 may comprise a detection region 125 centrally located in the pixel 120 and a plurality of concentric photodiodes. For example, the first pixel 120(1) comprises a first plurality of concentric photodiodes 310(1a), 310(1b), 310(1c), wherein the first plurality of concentric photodiodes are concentric with each other and concentric with the first detection region 125(1). Further each photodiode 310(1a), 310(1b), 310(1c) may be described as being positioned laterally adjacent to the first sidewall 145(1). The present arrangement may be utilized for detecting multiple wavelengths emitted from the biological fluid.

Similarly, the second pixel 120(2) comprises the second detection region 125(2) and a second plurality of concentric photodiodes 310(2a), 310(2b), 310(2c), wherein the second plurality of concentric photodiodes are concentric with each other and concentric with the second detection region 125(2). Further each photodiode 310(2a), 310(2b), 310(2c) may be described as being positioned laterally adjacent to the second sidewall 145(2)

Figure 6:
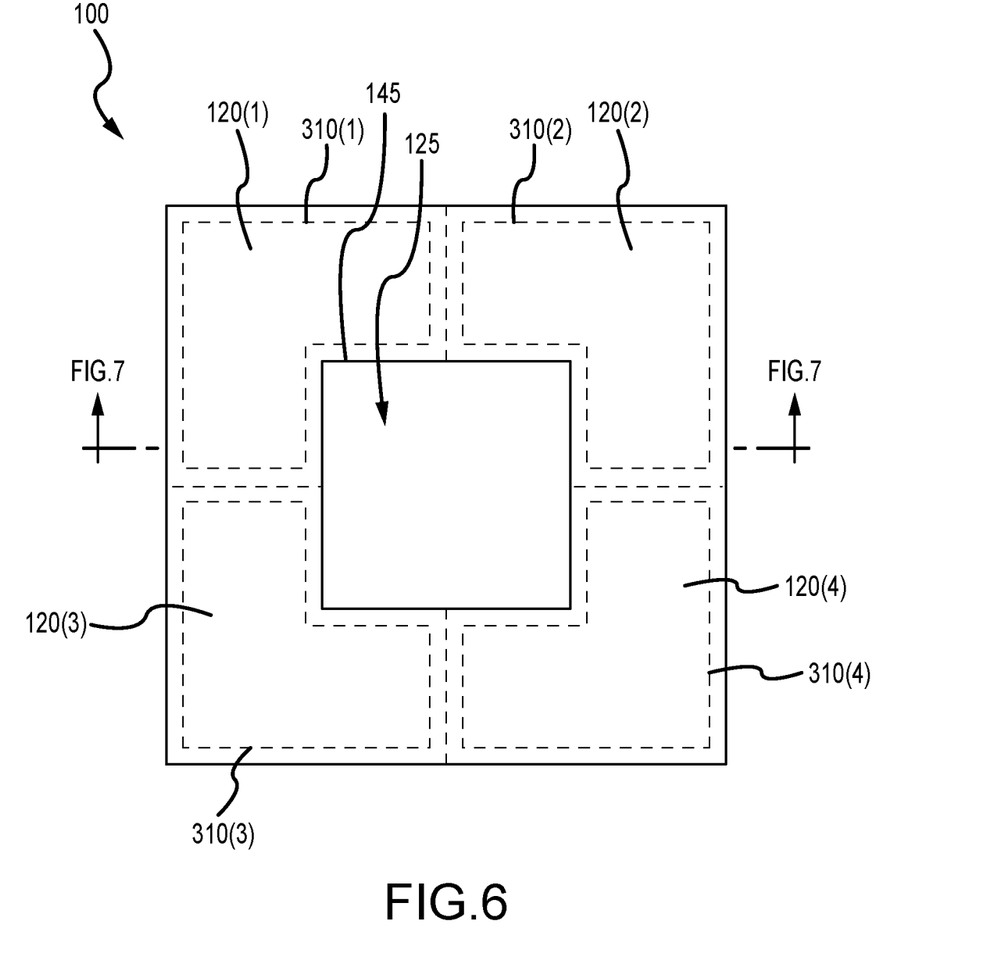
FIG. 6 is a top view of a biosensor in accordance with an alternative embodiment of the present technology.
Figure 7:
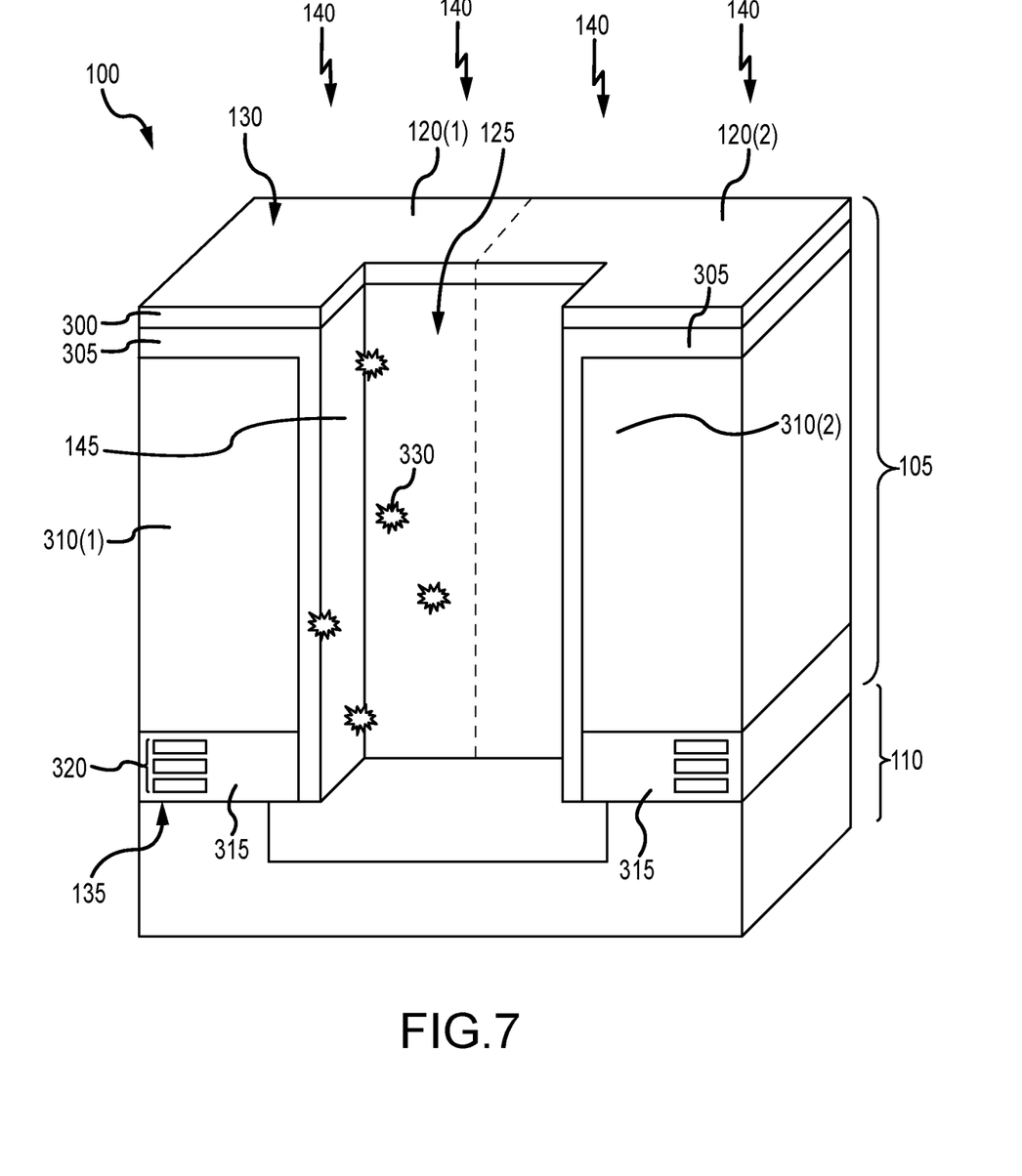
FIG. 7 is a cross-sectional view of the biosensor of FIG. 6 in accordance with an exemplary embodiment of the present technology.

In yet another alternative embodiment and referring to FIGS. 6 and 7, multiple pixels 120 may be arranged to share a single detection region 125. For example, the first, second, third, and fourth pixels 120(1), 120(2), 120(3), 120(4) share one detection region 125, and the sidewall 145 forming the detection region 125 are formed, in part, by each pixel 120(1), 120(2), 120(3), 120(4). In other words, each pixel 120(1), 120(2), 120(3), 120(4) is disposed laterally adjacent to at least a portion of the sidewall 145. In the present embodiment, the pixels 120 that share one detection region 125 may be referred to as a pixel subset. The number of pixels 120 that share a single detection region 125 may vary and be based on the particular application. For example, two pixels may share a single detection region 125, six pixels may share a single detection region 125, etc.

According to various embodiments, each pixel 120 may further comprise a passivation layer 305 formed on a surface of at least one photodiode 310. For example, in one embodiment and referring to FIG. 3, the passivation layer 305 is a continuous layer that covers a surface of the first photodiode 310(1) and the second photodiode 310(2).

In an alternative embodiment, and referring to FIG. 5, the passivation layer 305 is a continuous layer that covers the surfaces of the concentric photodiodes 310 to varying degrees. For example, due to the manner in which the concentric photodiodes 310(1a), 310(1b), 310(1c) are arranged around the first detection region 125(1), the passivation layer 305 may cover a larger surface of photodiode 310(1a) than photodiodes 310(1b) and 310(1c).

According to various embodiments, the passivation layer 305 forms the sidewall 145 of the detection region 125 and provides a barrier between the photodiode 310 and the biological fluid that may be present in the detection region 125. The passivation layer 305 may comprise any material suitable for protecting the photodiode 310. For example, the passivation layer 305 may comprise silicon dioxide ($SiO_2$) or silicon nitride ($Si_3N_4$) to prevent corrosion. The passivation layer 305 may also act as an anti-reflective coating layer and improve the transmission of the emitted fluorescence.

The sensor chip 105 may further comprise a metal layer 300 deposited on an upward facing surface of the passivation layer 305. In other words, the metal layer 300 may form the first planar surface 130 of the pixel 120. The metal layer 300 may comprise any metal suitable for blocking excitation light 140 or otherwise suppressing (decreasing the amount) the excitation light 140 from entering the photodiode 310.

Figure 4:
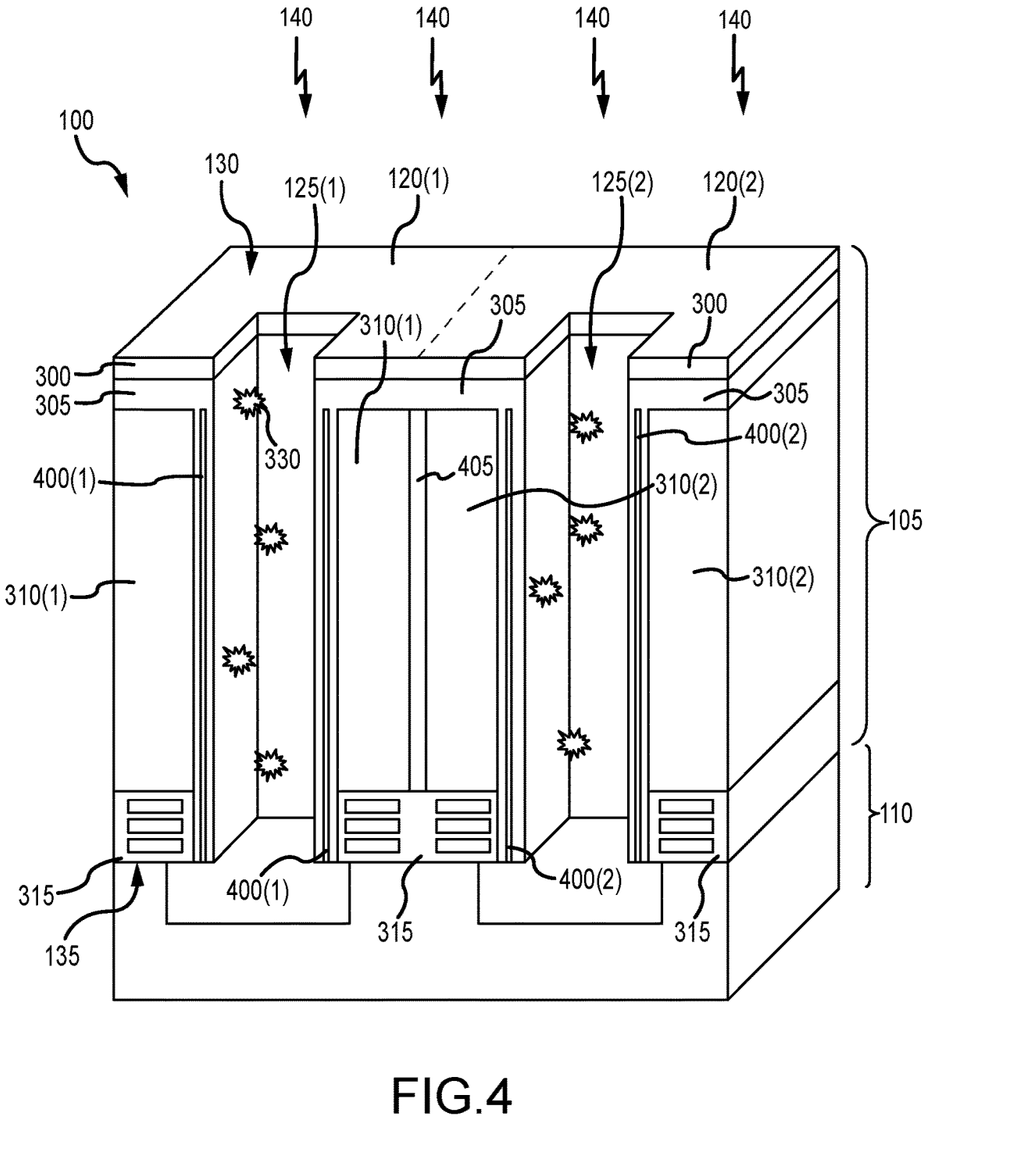
FIG. 4 is an alternative cross-sectional view of the biosensor in accordance with an exemplary embodiment of the present technology.

Referring to FIG. 4, the sensor chip may further comprise a wavelength filter 400 (i.e., an interference (dichroic) filter or an absorption filter) to selectively pass light having a particular wavelength, while reflecting other light. For example, the wavelength filter 400 may be selected to improve suppression of the excitation light 140, but allow fluorescence 330 to pass through. The wavelength filter 400 may be adjacent to the sidewalls 145 of the detection region 125 and may be formed within the passivation layer 305. The wavelength filter 400 may comprise any material suitable and thickness for reflecting a portion of light and allowing the passage of the remaining light. For example, the wavelength and color range of the wavelength filter 400 may be controlled by the thickness of the wavelength filter 400.

The sensor chip may further comprise an isolation region 405 formed between adjacent photodiodes 310 to provide optical isolation between adjacent photodiodes 310 and/or to prevent cross-talk between adjacent photodiodes 310. For example, the isolation region 405 may be formed between the first photodiode 310(1) of the first pixel 120(1) and the second photodiode 310(2) of the second pixel 120(2). The isolation region 405 may extend vertically completely separating the adjacent photodiodes 310 or may extend vertically and separating only a portion of the adjacent photodiodes 310. The isolation region 405 may be formed by various methods and processes, such as a backside deep trench isolation process and/or a frontside deep trench isolation process. According to various embodiments, the isolation region 405 may comprise a dielectric material, a polysilicon material, or a metal material (or a combination of different materials). The size and material of the isolation region 405 may be selected according to the particular application. For example, the isolation region 405 may function as an optical absorber or an optical reflector.

The sensor chip 105 may further comprise a dielectric layer 315 separating the photodiode from the carrier chip 110. In various embodiments, the dielectric layer may comprise inner metal layers 320 and may form a portion of the second planar surface 135 of the sensor chip 105. The dielectric layer 315 may comprise any material suitable for insulating the photodiode 310 from the inner metal layers 320.

The sensing device 100 may further comprise a microlens (not shown) to focus the excitation light 140 onto the biological fluid. For example, the microlens may be positioned adjacent to the first planar surface 130 of the sensor chip 105 and centered directly above the detection region 125. The microlens may comprise any suitable material and may be formed using conventional techniques.

In embodiments comprising the microlens, the detection regions 125 may be formed using any suitable method or process that pre-defines the detection regions 125 in a selectively etchable material before the microlens is formed and then etches the detection regions 125 out afterwards.

The sensing device 100 may further comprise a particle filter (not shown) to separate various particles and/or molecules from the fluid sample. For example, the grid may be positioned at or near the first planar surface 135 such that when the biological fluid flows into the detection region 125, the grid may prevent larger particles and/or molecules from entering the detection region 125.

The sensing device 100 may further comprise a set of electrodes (not shown) having opposite polarities to generate an electric field in the detection region 125. The electric field may be utilized to control the fluid movement for detecting a dipole orientation of the biological molecule. For example, one electrode may be connected at or near the first planar surface 130 and the remaining electrode may be connected at or near the second planar surface 135. The set of electrodes may comprise a metal or any suitable material.

The sensing device 100 may further comprise various circuits to transform the charge into a pixel signal, amplify the signal, and perform various processing on the signal. In various embodiments, the carrier chip 110 may be electrically connected to the sensor chip 105 and comprise various electrical connections, such as metal interconnects and/or bonds, that are used to facilitate various signal processing operations.

In an exemplary embodiment, the carrier chip 110 may be further configured to collect the biological fluid that flows through the detection region 125. For example, and referring to FIGS. 8 and 9, the collection area 800 may comprise a network of interconnected channels, where the collection area 800 collects or otherwise receives the biological fluid from one or more detection regions 125. Alternatively, the collection area 800 may comprise a single reservoir (not shown).

Figure 9:
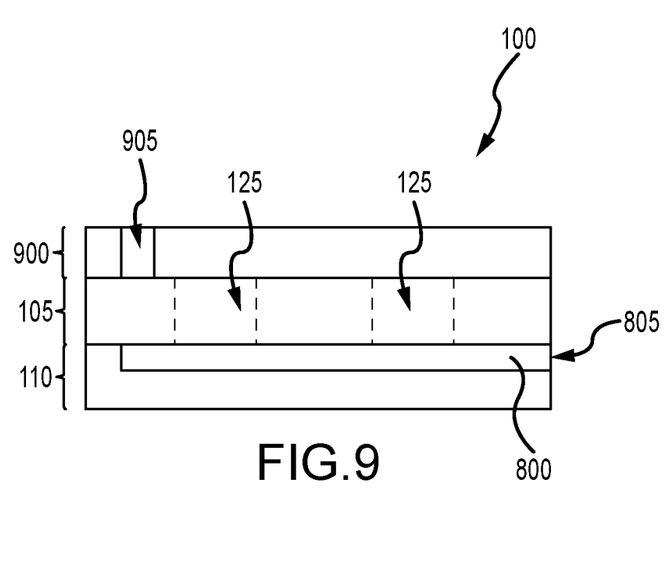
FIG. 9 is a cross-sectional view of the carrier chip in accordance with an exemplary embodiment the present technology.

In an exemplary embodiment, the sensing device 100 may comprise a glass layer 900 situated above the sensor chip 105 and comprising one or more holes 905 to facilitate flow of the biological fluid from outside of the sensing device 100 into the detection region 125 and into the collection area 800.

Figure 8:
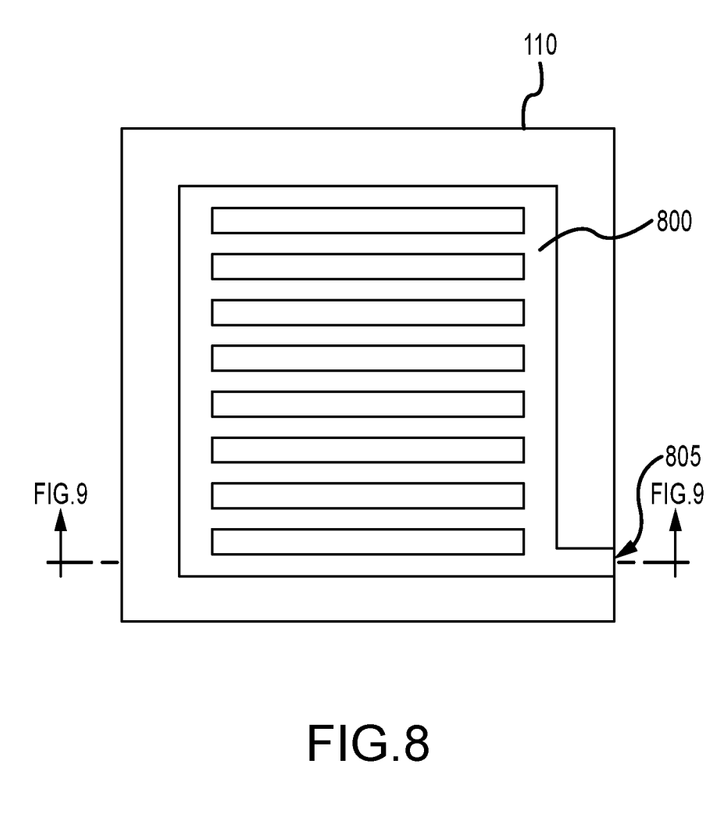
FIG. 8 is a top view of a carrier chip in accordance with an exemplary embodiment of the present technology.

According to various embodiments, the carrier chip 110 may further comprise an outlet 805 configured to facilitate flow of the biological fluid out of the collection area 800 and out of the carrier chip 110. Accordingly, the outlet 805 is connected to the collection area 800 and terminates at an edge of the carrier chip 110.

The sensing device 100 may further comprise a return channel (not shown) to facilitate flow of the biological fluid from the collection area 800 and back into the detection region 125. For example, the return channel may connect the outlet 805 to the one or more holes 905 in the glass layer 900 to provide continuous flow of the biological fluid into and out of the detection region 125.

Referring to FIGS. 1-9 and according to various embodiments, the biological fluid is flowed into the detection region 125. In some cases, the excitation light 140 may be used to generate fluorescence 330 in the biological fluid. The photodiode 120 surrounding the detection region 125, which contains the biological fluid emitting fluorescence 330, detects the fluorescence 330. In other cases, however, the biological fluid may be self-emitting, such that the excitation light 140 is not required to generate fluorescence 330.

As the biological fluid flows into or through the detection region 125, the carrier chip 110 may utilize the signals from each pixel 120 to determine a count number of emitters, the presence of an emitter, the dipole orientation of the molecule, perform correlated interference-based measurements where special events within a time frame and/or wavelength that are in-phase may be detected, separate light having different wavelengths.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A sensing device, comprising:
  a sensor chip having a first horizontal surface and an opposing second horizontal surface, and comprising:
    an array of pixels extending from the first horizontal surface to the second horizontal surface, wherein each pixel comprises at least one photodiode; and
    a plurality of detection regions arranged vertically in the pixel array, wherein each detection region:
      is defined by a substantially vertical sidewall extending between the first and second horizontal surfaces; and
      comprises an opening at the first horizontal surface;
    wherein a first photodiode from the array of pixels is positioned lateral to at least a portion of the sidewall of a first detection region from the plurality of detection regions.

2. The sensing device of claim 1, wherein the sensor chip further comprises: a metal layer adjacent to each photodiode and forming the first horizontal surface.

3. The sensing device of claim 1, wherein the sensor chip further comprises: a microlens arranged adjacent to the first horizontal surface and directly above the opening of the first detection region from the plurality of detection regions.

4. The sensing device of claim 1, further comprising: a passivation layer disposed on a surface of each photodiode in the array of pixels.

5. The sensing device of claim 4, further comprising: an electromagnetic wavelength filter disposed within the passivation layer adjacent to the detection region.

6. The sensing device of claim 1, wherein:
  a first pixel from the array of pixels comprises the first photodiode and a second photodiode; and
  the first and second photodiodes are positioned concentric with each other and positioned laterally adjacent to the sidewall of the first detection region from the plurality of detection regions.

7. The sensing device of claim 1, wherein the first detection region from the plurality of detection regions is centrally located in one pixel of the array of pixels and the first photodiode is disposed concentrically around the detection region.

8. The sensing device of claim 1, wherein the first detection region of the plurality of detection regions is centrally located within a pixel subset from the array, the pixel subset comprising at least the first photodiode and a second photodiode, and the first and second photodiodes are disposed laterally adjacent to at least a portion of the sidewall.

9. The sensing device of claim 1, wherein the sensor chip further comprises an isolation region disposed between adjacent photodiodes, and configured to prevent charge migration between the adjacent photodiodes.

10. The sensing device of claim 1, further comprising a carrier chip bonded to the second horizontal surface, and comprising a collection area.

11. A method for detecting fluorescence in a fluid containing a biological material, comprising:
  flowing the fluid through a channel arranged vertically in a pixel, wherein:
    the pixel comprises a photodiode,
    the channel comprises a substantially vertical sidewall, and
    the photodiode is concentric with the channel.

12. The method of claim 11, further comprising: generating an electric field in the fluid.

13. The method of claim 11, further comprising: filtering the fluorescence with an electromagnetic wavelength filter.

14. The method of claim 11, further comprising: flowing the fluid from the channel and into a collection area formed below the pixel.

15. A sensing device adapted for detecting fluorescent radiation in a biological fluid, comprising:
  a sensor chip, comprising:
    an array of pixels, wherein each pixel comprises:
      a photodiode comprising: a vertical thru-hole centrally located in the photodiode and defined by a vertical sidewall;
      a passivation layer disposed on the photodiode; and
      a metal layer disposed on the passivation layer and forming a first horizontal surface of the sensor chip; and
  a carrier chip bonded to an opposing second horizontal surface of the sensor chip, and comprising a collection area configured to receive the biological fluid from the thru-hole.

16. The sensing device of claim 15, further comprising a microlens arranged adjacent to the metal layer and directly above the thru-hole.

17. The sensing device of claim 15, further comprising an electromagnetic wavelength filter disposed within the passivation layer between the vertical thru-hole and the photodiode.

18. The sensing device of claim 15, wherein each pixel comprises a plurality of concentric photodiodes disposed around the sidewall and concentric with the thru-hole.

19. The sensing device of claim 15, further comprising: an anti-reflective coating deposited on the sidewall.

20. The sensing device of claim 15, further comprising: an isolation region disposed between adjacent photodiodes.

* * * * *